United States Patent Office.

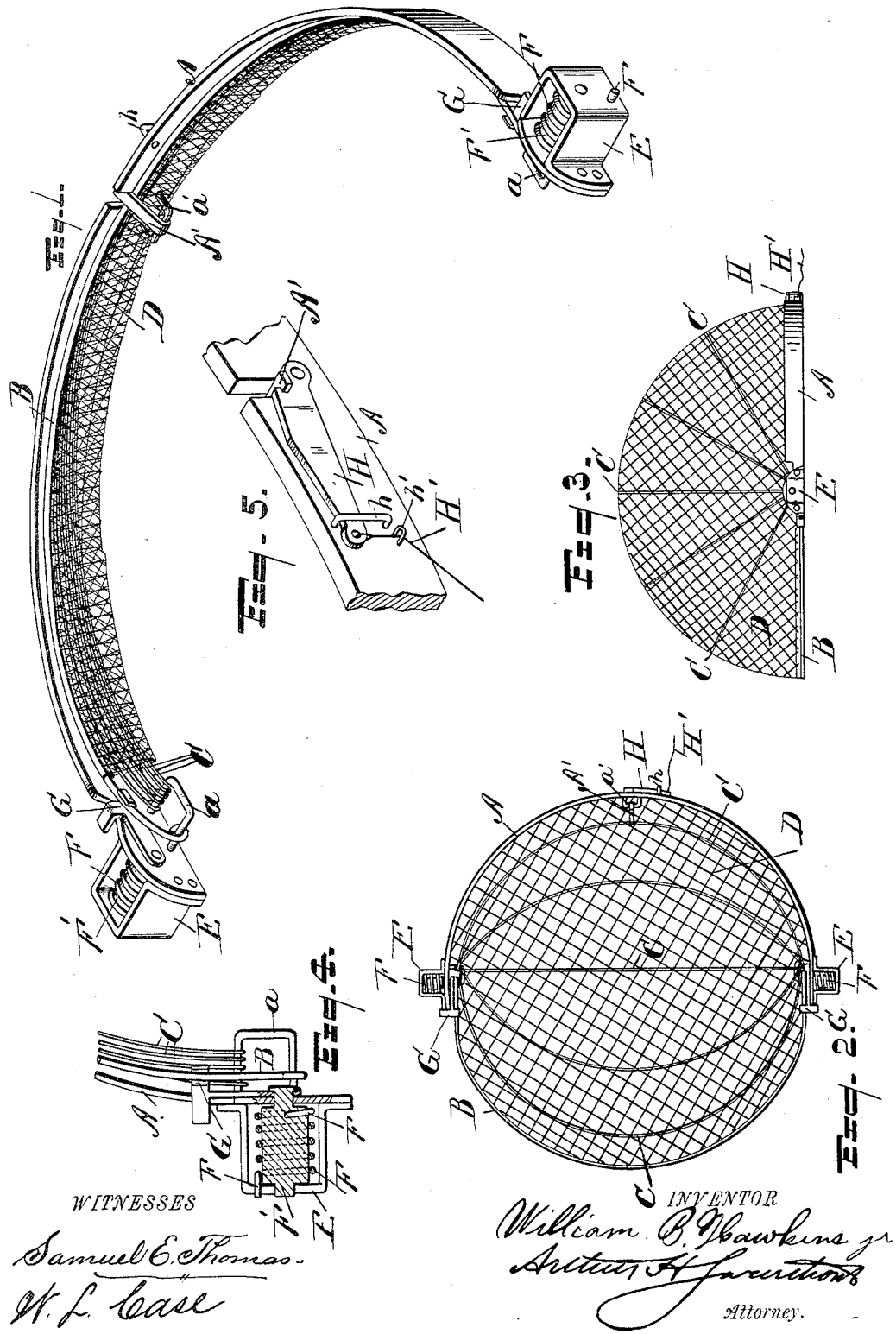

WILLIAM B. HAWKINS, JR., OF EAST SAGINAW, MICHIGAN.

SPARROW-TRAP.

SPECIFICATION forming part of Letters Patent No. 433,241, dated July 29, 1890.

Application filed November 14, 1889. Serial No. 330,295. (No model.)

*To all whom it may concern:*

Be it known that I, WILLIAM B. HAWKINS, Jr., a citizen of the United States, residing at the city of East Saginaw, in the county of Saginaw and State of Michigan, have invented certain new and useful Improvements in Sparrow-Traps; and I do hereby declare that the following is a full, clear, and exact description of the same, reference being had to the annexed drawings, making a part of this specification, and to the letters of reference marked thereon.

Figure 1 represents the trap set; Fig. 2, a top view of the trap sprung; Fig. 3, a side view of the trap sprung; Fig. 4, a sectional view of one end of the trap, showing coiled spring and portion of the frame. Fig. 5 shows the set-lock or latch.

In the drawings, A represents the frame, semicircular in form, and may be made of either metal or wood.

E E are boxes secured to ends of frame A, and inclosing coiled wire springs F F, working on a cylinder F' F', said cylinder having its bearings in frame A and boxing E.

To cylinder F' F' is connected on inside of frame A the catch G G, having two arms, one extending outward and resting on frame A when the trap is set and on ground when sprung, the other extending inward and with its end bent up forms a hook in which is placed the semicircular wire B. B is loosely hinged to frame A by staples $a\ a$, to which are also attached semicircular wires C C C.

D is the covering for the trap, and may be of netting, mesh-work or cloth, or both, and is secured to the upper edge of frame A and to the semicircular wire B, also to C C C when they are used. When the trap is sprung, the springs carry the wires B C C C, attached to them by means of the catch G G, over, describing a semicircle, and, together with the frame A, forming the inclosure and securing the bird. In order that the force of the springs may not cause the frame to rise from the ground at E E when the trap is sprung, the catch G G is so arranged that it will strike against the staple-hinge $a\ a$ before it reaches the ground. A' is a catch-bar hinged to frame A by projecting staple $a'$, and arranged to hold the wires B C C C when trap is set by engaging a notch in the latch H, which is pivoted to the frame A on outside. To one end of the latch H is attached a cord. Pulling the cord springs the trap.

Any well-known means may be employed for locking and unlocking the trap.

I do not wish to be understood as confining myself to any special form of construction of frame or wires, or the manner of connecting them to the frame, and therefore any change or modification may be made as comes within ordinary mechanical skill without departing from the principle of my invention. It is obvious, also, that the leading semicircular wire B might be attached to or made a part of the coiled springs F F, thus doing away with the catch G G, which I claim the right to do, if desirable.

The supplemental wires C C C may or may not be used. They are serviceable in keeping the covering off the bird, and in carrying the covering back for resetting.

Having thus fully described my invention, what I claim as new, and desire to secure by Letters Patent, is—

1. In a sparrow-trap, the combination of the frame A, semicircular in form, and the springs F F, inclosed in boxing E E, secured to ends of frame A and working on cylinders F' F', with the semicircular wire B, connected to springs F F and the covering D, and the catch-bar A', hinged to frame A and engaging the latch H and the cord H', forming a set-lock, substantially as and for the purpose set forth.

2. In a sparrow-trap, the combination of the frame A and the springs F F, inclosed in boxing E E, secured to ends of frame A and working on cylinders F' F', and the catch G G, secured to cylinders F' F', with the semicircular wire B, hinged to frame A and resting in arm of catch G G, and the set-lock composed of the catch-bar A' and the latch H and the cord H', substantially as and for the purpose set forth.

3. In a sparrow-trap, the combination of the frame A and the springs F F, inclosed in boxing E E and secured to end of frame A and working on cylinders F' F', and the catch G G, secured to cylinders F' F', with the semicircular wire B, hinged to frame A and resting in catch G G, the supplemental wires C C C, the covering D, and the set-lock composed of the catch-bar A' and the latch H and the cord H', substantially as and for the purpose set forth.

4. In a sparrow-trap, the combination of the frame A and the springs F F, and the leading wire B, connected with the springs F F, with the supplemental wires C C C, the covering D, and the set-lock composed of the catch-bar A', the latch H, and the cord H', substantially as and for the purpose set forth.

In testimony that I claim the above I have hereunto subscribed my name in the presence of two witnesses.

WILLIAM B. HAWKINS, JR.

Witnesses:
W. L. CASE,
A. H. SWARTHOUT.